(12) United States Patent
Horowitz et al.

(10) Patent No.: US 7,020,203 B1
(45) Date of Patent: Mar. 28, 2006

(54) DYNAMIC INTRA-CODED MACROBLOCK REFRESH INTERVAL FOR VIDEO ERROR CONCEALMENT

(75) Inventors: Michael Horowitz, Austin, TX (US); Rick Flott, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 436 days.

(21) Appl. No.: 10/328,513

(22) Filed: Dec. 23, 2002

Related U.S. Application Data (60) Provisional application No. 60/343,283, filed on Dec. 21, 2001.

(51) Int. Cl.
*H04N 7/12* (2006.01)
(52) U.S. Cl. .................................. 375/240.24
(58) Field of Classification Search ........... 375/240.27, 375/240.24, 240.02, 240.08, 240.13; 382/239, 382/252; H04N 7/12
See application file for complete search history.

(56) References Cited

U.S. PATENT DOCUMENTS

| | | | | |
|---|---|---|---|---|
| 5,136,378 | A | * | 8/1992 | Tsurube .................... 348/415.1 |
| 5,537,338 | A | | 7/1996 | Coelho .................... 364/514.12 |
| 5,835,144 | A | | 11/1998 | Matsumura et al. |
| 6,025,888 | A | * | 2/2000 | Pauls ..................... 375/240.27 |
| 6,115,076 | A | | 9/2000 | Linzer |
| 6,611,561 | B1 | * | 8/2003 | Hannuksela et al. ... 375/240.27 |
| 6,611,674 | B1 | * | 8/2003 | Jokimies et al. .............. 455/69 |
| 2001/0050955 | A1 | | 12/2001 | Zhang et al. |
| 2002/0172283 | A1 | | 11/2002 | Kawakatsu et al. ..... 375/240.13 |
| 2003/0067981 | A1 | * | 4/2003 | Zhao et al. ............ 375/240.08 |
| 2004/0114684 | A1 | * | 6/2004 | Karczewicz et al. ... 375/240.03 |

FOREIGN PATENT DOCUMENTS

| | | |
|---|---|---|
| EP | 0 933 948 A2 | 8/1999 |
| WO | WO 02/071639 A1 | 9/2002 |

OTHER PUBLICATIONS

Lidinsky, Bill, "Overview of Videoconferencing," PowerPoint Presentation, Oct. 16, 1996, HEP Network Resource Center.
Drew, Mark S., "Video Compression," Class Materials, Original Date of Publication Unknown, School of Computing Science at Simon Fraser University, originally posted at: http://www.cs.sfu.ca/CourseCentral/365/li/materials/notes/Chap4/Chap4.3/Chap4.3html.
Search Report received in corresponding European application Serial 03029292.4-2223-; Oct. 27, 2004.
Robert Shaffer, et al.; "*Improving Perceptual Quality and Network Performance for Transmission of H263 Video over ATM;*" Department of Computing Science, University of Alberta; pp. 1749-1753; Sep. 1999.

* cited by examiner

*Primary Examiner*—Nhon Diep
(74) *Attorney, Agent, or Firm*—Wong, Cabello, Lutsch, Rutherford & Brucculeri, LLP (57) ABSTRACT

The present invention provides, in one embodiment, a system and method for concealing video errors. The system includes a coding engine for processing each frame of a video signal to generate macroblocks, selecting a refresh interval based upon network communication parameters, and encoding one or more of the macroblocks as refresh intra-coded macroblocks based upon the selected refresh interval. The refresh intra-coded macroblocks are placed into discrete data packets for transmission across a network to one or more remote devices. Upon receiving other refresh intra-coded macroblocks from a remote device via the network, the coding engine decodes the received intra-coded macroblocks, and places the decoded macroblocks in a newly decoded video frame to be used as reference frame macroblocks for reducing video errors associated with prediction drift.

27 Claims, 9 Drawing Sheets

| Format | Resolution (pixels/line x lines/frame) | Bit Rate at 30 fps (Mbps) |
|---|---|---|
| SQCIF (Sub Quarter CIF) | 128 x 96 | 4.4 |
| QCIF (Quarter CIF) | 176 x 144 | 9.1 |
| CIF | 352 x 288 | 36.5 |
| 4CIF (4 x CIF) | 704 x 576 | 146.0 |
| 16CIF (16 x CIF) | 1408 x 1152 | 583.9 |

| Call Rate (CR)\Error Rate (ER) | ER ≤ 3% | 3% < ER ≤ 6% | 6% < ER ≤ 10% | ER >10% |
|---|---|---|---|---|
| CR ≤ 384 kbps | 149 | 97 | 97 | 65 |
| 384 < CR < 768 kbps | 97 | 97 | 65 | 43 |
| CR ≥ 768 kbps | 65 | 65 | 43 | 29 |

DYNAMIC INTRA-CODED MACROBLOCK REFRESH INTERVAL FOR VIDEO ERROR CONCEALMENT

CROSS REFERENCE TO RELATED APPLICATION

This application claims the benefit of Provisional Patent Application Serial No. 60/343,283, filed Dec. 21, 2001, entitled "Dynamic Intra-Macroblock Refresh Rate for Video Error Concealment," which is incorporated herein by reference.

BACKGROUND OF THE INVENTION

1. Field of the Invention

The present invention relates generally to video communication, and more particularly to video error concealment.

2. Description of Related Art

Video images have become an increasingly important part of global communication. In particular, video conferencing and video telephony have a wide range of applications such as desktop and room-based conferencing, video over the Internet and over telephone lines, surveillance and monitoring, telemedicine, and computer-based training and education. In each of these applications, video and accompanying audio information is transmitted across telecommunication links, including telephone lines, ISDN, DSL, and radio frequencies.

Figure 1:
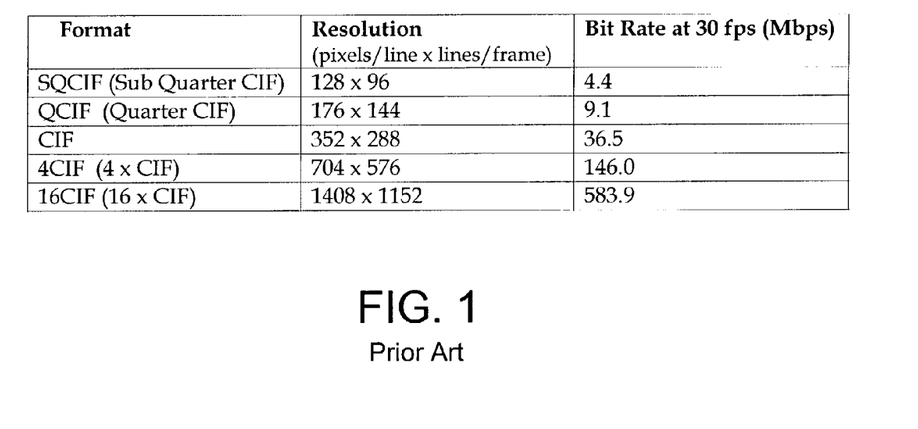
FIG. 1 is a table of the resolution and bit rate requirements for various video formats, according to the prior art.

A standard video format used in video conferencing is Common Intermediate Format (CIF), which is part of the International Telecommunications Union (ITU) H.261 videoconferencing standard. Additional formats with resolutions higher and lower than CIF have also been established. FIG. 1 is a table of the resolution and bit rate requirements for various video formats under an assumption that 12 bits are, on average, required to represent one pixel. The bit rates (in megabits per second, Mbps) shown are for uncompressed color video frames.

Presently, efficient transmission and reception of video signals may require encoding and compression of video and accompanying audio data. Video compression coding is a method of encoding digital video data such that less memory is required to store the video data and a required transmission bandwidth is reduced. Certain compression/decompression (CODEC) schemes are frequently used to compress video frames to reduce required transmission bit rates. Thus, CODEC hardware and software allow digital video data to be compressed into a more compact binary format than required by the original (i.e., uncompressed) digital video format.

Several conventional approaches and standards to encoding and compressing source video signals exist. Some standards are designed for a particular application such as JPEG (Joint Photographic Experts Group) for still images and H.261, H.263, MPEG (Moving Pictures Experts Group), MPEG-2, and MPEG-4 for moving images. For moving images, these coding standards, typically, use block-based motion-compensated prediction on 16×16 pixels, commonly referred to as macroblocks. In one embodiment, a macroblock is a unit of information containing four 8×8 blocks of luminance data and two corresponding 8×8 blocks of chrominance data in accordance with a 4:2:0 sampling structure, where the chrominance data is subsampled 2:1 in both vertical and horizontal directions.

For applications in which audio accompanies video, as a practicality, audio data also must be compressed, transmitted, and synchronized along with the video data. Synchronization, multiplexing, and protocol issues are covered by standards such as H.320 (ISDN-based video conferencing), H.324 (POTS-based video telephony), and H.323 (LAN or IP-based video conferencing). H.263 (or its predecessor, H.261) provides the video coding part of these standards groups.

A motion estimation and compensation scheme is one conventional method typically used for reducing transmission bandwidth requirements for a video signal. Because the macroblock is the basic data unit, the motion estimation and compensation scheme may compare a given macroblock in a current video frame with the given macroblock's surrounding area in previously transmitted reference video frames, and attempt to find a close data match. If a close data match is found, the scheme subtracts the given macroblock in the current video frame from a closely matched, offset macroblock in a previously transmitted reference video frame so that only a difference (i.e., residual) and the spatial offset needs to be encoded and transmitted. The spatial offset is commonly referred to as a motion vector. If the motion estimation and compensation process is efficient, the remaining residual macroblock should contain a small amount of information thereby leading to efficient compression.

Video data may be transmitted over packet switched communication networks or on heterogeneous communications networks in which one of the endpoints is associated with a circuit-switched network, and a gateway or other packet-switched to circuit switched network bridging device is used. When preparing video frame information for transmission over a packet switched communication network, encoding schemes transform the video frame information, compressed by motion estimation and compensation techniques or other compression schemes into data packets for transmission across the communication network. Data packets are sometimes lost, duplicated, or delayed which can introduce errors resulting in video quality degradation.

For example, if one or more data packets of a previously transmitted reference frame are lost upon transmission from a source encoding unit to a target decoding unit, then a mismatch between encoder and decoder reference frames typically results. When the encoder and decoder reference frames are not mismatched, a residual computed and transmitted by the encoder is decoded and added to a motion compensated video frame derived from the decoder's reference frame. Roughly speaking, in the absence of transmission errors, the resulting decoded video frame exactly matches the encoder's reference frame. When a reference frame mismatch occurs, the sum of the decoded residual and the decoder's motion compensated video frame results in a decoded video frame that further differs from the encoder's reference frame. Without correction, these differences, called prediction drift, increase until the decoded video becomes unintelligible even if subsequent encoded video is received error free.

Therefore, there is a need for a system and a method to conceal errors caused by data packet loss and reference frame mismatches, thereby improving video quality.

SUMMARY OF THE INVENTION

The present invention reduces video error generation, persistence, propagation, and amplification caused by reference frame mismatches associated with packet loss of video data. In general, the present invention provides a system and method that dynamically selects a refresh interval based upon network communication parameters, and intra-codes a specific pattern of macroblocks based upon the selected refresh interval. Since intra-coded macroblocks are bit expensive, the number of macroblocks intra-coded per video frame based upon the selected refresh interval is balanced by an increase in data transmission cost. In an exemplary embodiment of the invention, a coding engine is provided for processing each frame of a video signal to generate macroblocks, selecting a refresh interval based upon network communication parameters, and encoding one or more of the macroblocks as refresh intra-coded macroblocks based upon the selected refresh interval.

In a further exemplary embodiment, a video signal is transformed into a plurality of macroblocks, where each frame of the video signal has an integer number of macroblocks dependent upon a video signal format. Then, a refresh interval is selected based upon network call rates and packet-loss error rates, and one or more of the plurality of macroblocks are intra-coded in a specific pattern based upon the selected refresh interval. These macroblocks are referred to as refresh intra-coded macroblocks. Macroblocks that are not intra-coded as refresh macroblocks are either intra-coded or inter-coded based upon any number of selection criteria. For example, a given macroblock may be inter-coded if data content of the given macroblock and data content of an offset macroblock from a previous frame are similar, and intra-coded otherwise.

In another embodiment of the invention, the encoded macroblocks are placed into discrete data packets for transmission over a network to one or more remote devices. In addition, refresh intra-coded macroblocks received from a remote device via the network are used in lieu of macroblocks motion compensated from a previous video frame to reduce prediction drift.

In another embodiment of the invention, the refresh interval decreases as the network call rates increase, for any given fixed packet-loss error rate. Furthermore, the refresh interval decreases as the packet-loss error rates increase, for any given fixed network call rate.

In yet another embodiment of the invention, the selected refresh interval is an integer, where the integer and factors of the integer are not evenly divisible into the integer number of macroblocks per frame. In addition, a number of macroblocks between refresh intra-coded macroblocks is equal to the selected refresh interval minus one. Furthermore, the selected refresh interval is equal to a number of video signal frames such that each macroblock associated with a spatial position within the video signal frames is encoded as a refresh intra-coded macroblock at least once.

DETAILED DESCRIPTION OF THE DRAWINGS

The present invention reduces prediction drift caused by a mismatch between reference frames on an encoder and those on a decoder by dynamically selecting an intra-coded macroblock refresh interval as a function of a packet-loss error rate and a call rate. By specifying that each macroblock associated with a spatial area of a video frame be intra-coded at least once within the selected refresh interval, one or more lost decoder reference frame macroblocks are replaced (i.e., refreshed) by good intra-coded macroblocks within the selected refresh interval, thus reducing an occurrence of reference frame mismatches. These improvements seek to attenuate the disturbances caused by data packet loss across a communication link. The scope of the present invention covers a variety of video standards, including, but not limited to, H.261, H.263, H.264, MPEG, MPEG-2, and MPEG-4.

Figure 2:
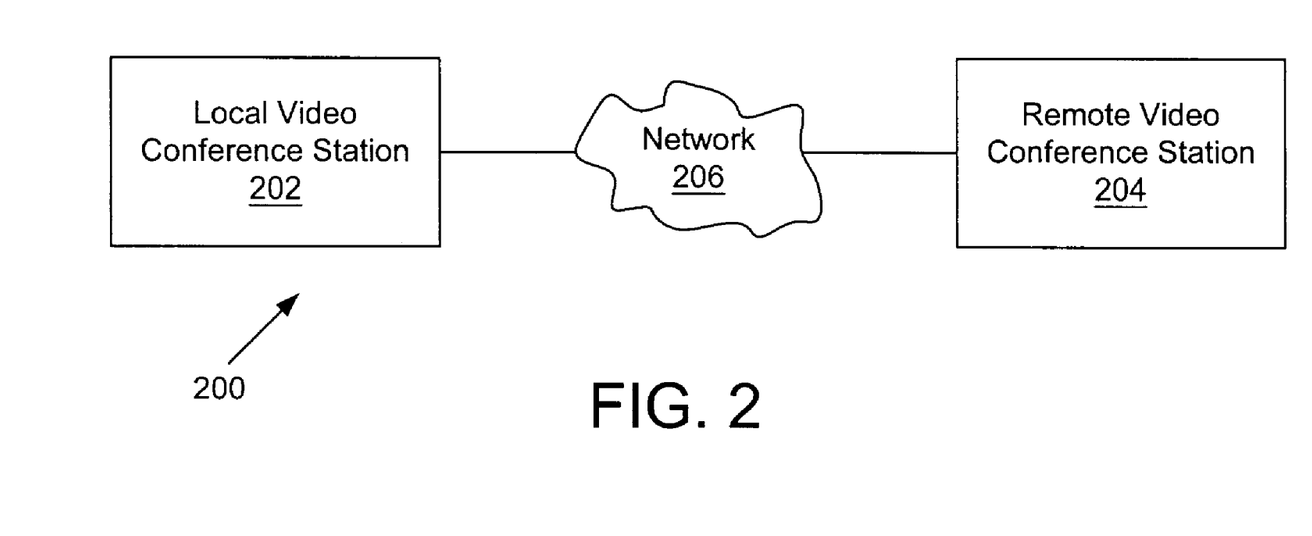
FIG. 2 is a block diagram of an exemplary video conferencing system, according to the present invention.

FIG. 2 illustrates an exemplary video conferencing system 200. The video conferencing system 200 includes a local video conference station 202 and a remote video conference station 204 connected through a network 206. Although FIG. 2 only shows two video conference stations 202 and 204, those skilled in the art will recognize that more video conference stations may be coupled to the video conferencing system 200. It should be noted that the present system and method may be utilized in any communication system where video data is transmitted over a network. The network 206 may be any type of electronic transmission medium, such as, but not limited to, POTS, cable, fiber optic, and radio transmission media.

Figure 3:
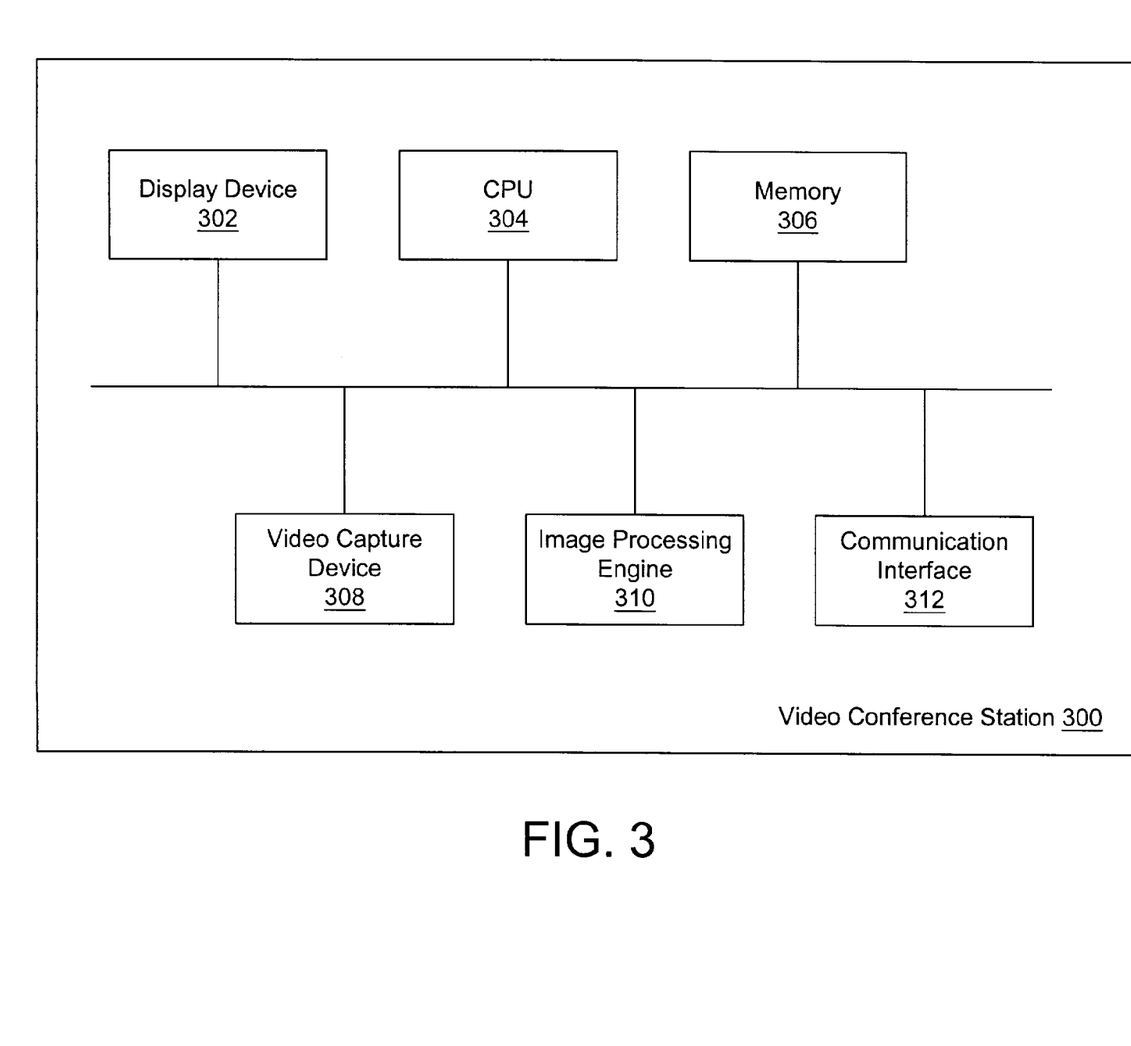
FIG. 3 is a block diagram of an exemplary video conference station of the video conferencing system of FIG. 2.

FIG. 3 is a block diagram of an exemplary video conference station 300. For simplicity, the video conference station 300 will be described as the local video conference station 202 (FIG. 2), although the remote video conference station 204 (FIG. 2) may contain a similar configuration. In one embodiment, the video conference station 300 includes a display device 302, a CPU 304, a memory 306, at least one video capture device 308, an image processing engine 310, and a communication interface 312. Alternatively, other devices may be provided in the video conference station 300, or not all above named devices provided. The at least one video capture device 308 may be implemented as a charge coupled device (CCD) camera, a complementary metal oxide semiconductor (CMOS) camera, or any other type of image capture device. The at least one video capture device 308 captures images of a user, conference room, or other scenes, and sends the images to the image processing engine 310. When encoded video is sent on a packet switched network (not shown), the image processing engine 310 processes the video image into data packets before the communication interface 312 transmits the data packets to the remote video conference station 204. The image processing engine 310 will be discussed in more detail in connection with FIG. 4. Conversely, the image processing engine 310 also transforms received data packets from the remote video conference station 204 into a video signal for display on the display device 302.

Figure 4:
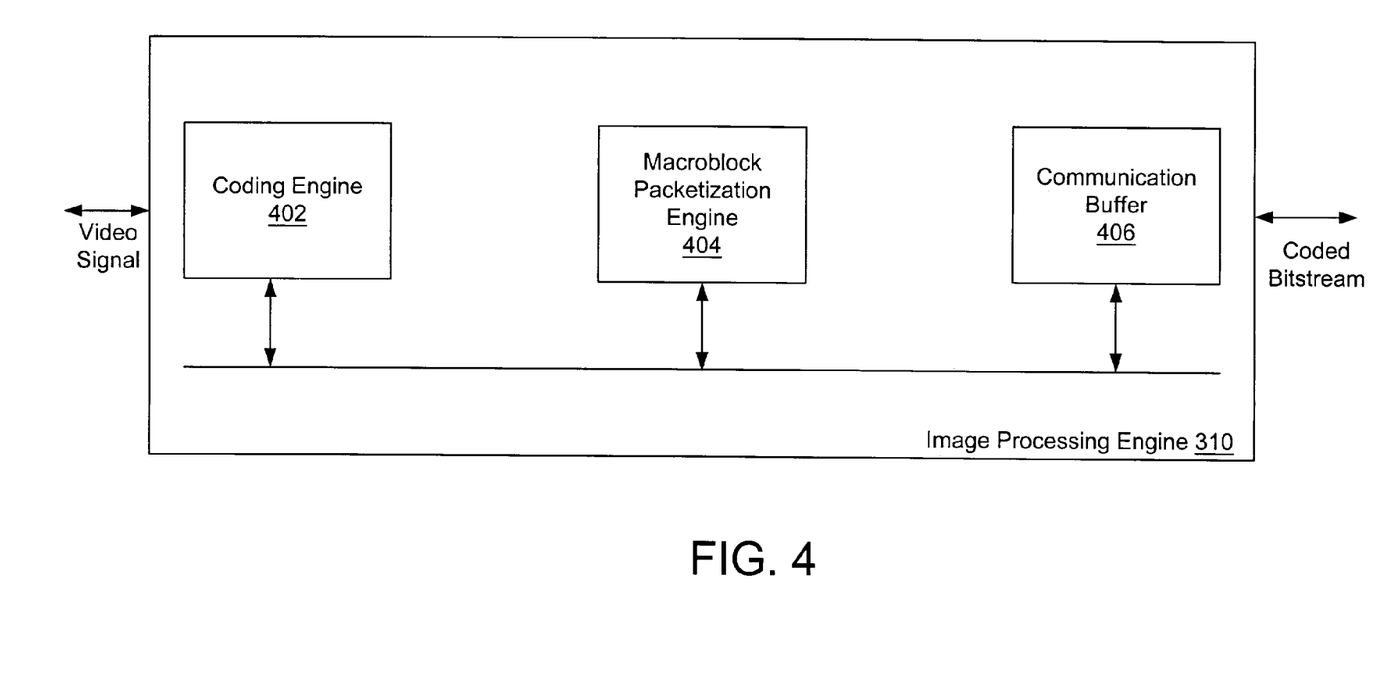
FIG. 4 is a block diagram of an exemplary embodiment of the image processing engine of FIG. 3.

FIG. 4 is an exemplary embodiment of the image processing engine 310 of FIG. 3. The image processing engine 310 includes a coding engine 402, a macroblock packetization engine 404, and a communication buffer 406. In other embodiments of the invention, the macroblock packetization engine 404 may be absent or may be incorporated in the coding engine 402, or the image processing engine 310 may include more or less elements.

Initially, a video signal from the video capture device 308 (FIG. 3) enters the coding engine 402, which converts each frame of video into a desired format, and transforms each frame of the video signal into a set of macroblocks. A macroblock is a data unit that contains blocks of data comprising luminance and chrominance components associated with picture elements (also referred to as pixels). For example, in H.263, a macroblock consists of four 8×8 blocks of luminance data and two corresponding 8×8 blocks of chrominance data in a 4:2:0 chroma sampling format. An 8×8 block of data is an eight-column by eight-row matrix of data, where each data corresponds to a pixel of the video frame. A 4:2:0 chroma formatted macroblock comprises data covering a 16 pixel by 16 pixel section of the video frame. However, the present invention is not limited to macroblocks as conventionally defined, but may be extended to any data unit comprising luminance and/or chrominance data. In addition, the scope of the present invention covers other sampling formats, such as a 4:2:2 chroma sampling format comprising four 8×8 blocks of luminance data and four corresponding 8×8 blocks of chrominance data, or a 4:4:4 chroma sampling format comprising four 8×8 blocks of luminance data and eight corresponding 8×8 blocks of chrominance data.

In addition, the coding engine 402 encodes (i.e., compresses) each macroblock to reduce the number of bits used to represent data content. Each macroblock may be "intra-coded" or "inter-coded," and a video frame may be comprised of any combination of intra-coded and inter-coded macroblocks. Inter-coded macroblocks are encoded using temporal similarities (i.e., similarities that exist between a macroblock from one frame and a closely matched macroblock from a previously coded frame). Specifically, a given inter-coded macroblock comprises encoded differences between the given macroblock and a closely matched macroblock from a previous reference video frame. The closely matched macroblock from the previous reference video frame may comprise data associated with pixels that are spatially offset from the pixels associated with the given macroblock. Alternatively, intra-coded macroblocks are encoded without use of information from other video frames.

In one embodiment of the invention, the coding engine 402 intra-codes macroblocks of a frame using a refresh mechanism. The refresh mechanism is a deterministic mechanism to eliminate mismatches between the encoder and decoder reference frames, called prediction drift, by intra-coding a specific pattern of macroblocks for each frame. For future reference, a macroblock intra-coded via the refresh mechanism will be referred to as a refresh intra-coded macroblock. The refresh mechanism will be discussed further below in conjunction with FIGS. 5–6.

For all the remaining macroblocks of a given frame that have not been intra-coded by the refresh mechanism, the coding engine 402 encodes each macroblock as intra-coded or inter-coded. For example, to determine if a given macroblock may be encoded as an inter-coded macroblock, the coding engine 402 computes differences between data of the given macroblock of a current video frame with data of a macroblock from a previous (or subsequent as in a case of bi-directionally predicted frame coding) reference video frame (referred to as an offset macroblock), where the differences may be realized, for example, by a mean-absolute error or a mean-squared error between data corresponding to pixels located at co-located positions within the macroblocks. For the given macroblock, the coding engine 402 computes errors for a plurality of spatially offset macroblocks. If the coding engine 402 only finds errors greater than a predetermined difference threshold value, then significant similarities do not exist between data from the given macroblock and data from the previous frame, and the macroblock is intra-coded. However, if an error is found to be less than the predetermined difference threshold value for the given macroblock and a given offset macroblock from the previous frame, then the given macroblock is inter-coded. The scope of the present invention covers other types of selection criteria to determine whether a given macroblock is intra-coded or inter-coded.

To inter-code the given macroblock, the coding engine 402 subtracts the given macroblock's data from the offset macroblock's data (i.e., luminance and chrominance data associated with a pixel of the given macroblock is subtracted from luminance and chrominance data associated with a corresponding pixel of the offset macroblock for every pixel) to give difference data, encodes the difference data using standard coding techniques such as Discrete Cosine Transforms and quantization methods among others, determines an offset vector from the given macroblock to the offset macroblock (referred to as a motion vector), and encodes the motion vector.

The coding engine 402 of the image processing engine 310 (FIG. 3) of the remote video conference station 204 (FIG. 2) may use a variety of error concealment techniques in conjunction with receiving refresh intra-coded macroblocks to improve video quality. For example, in one embodiment of the invention, the coding engine 402 decodes the neighboring macroblocks of a lost inter-coded macroblock, estimates a motion vector of the lost macroblock, and then uses the estimated motion vector to reconstruct data of the lost macroblock. In another embodiment of the invention, the coding engine 402 may decode the neighboring macroblocks of a lost intra-coded macroblock, and spatially interpolate the decoded neighboring data to reconstruct the lost data. The neighboring macroblocks of the lost inter-coded and lost intra-coded macroblocks may be one or more of the received refresh intra-coded macroblocks. The scope of the present invention covers other error concealment techniques used in conjunction with refresh intra-coded macroblocks to improve video quality due to lost macroblocks. Alternatively, the image processing engine 310 (FIG. 3) of the present invention may generate, transmit, and receive refresh intra-coded macroblocks without any other error concealment techniques to improve video quality.

Once the macroblocks of a given frame are encoded, the coding engine 402 sends the encoded macroblocks to the macroblock packetization engine 404. The macroblock packetization engine 404 places the encoded macroblocks into discrete data packets. The macroblock packetization engine 404 may place the encoded macroblocks of the given frame into the discrete data packets randomly, according to a raster scan order of the given frame, according to error concealment techniques, or according to any other methods. Typically, data from more than one encoded macroblock is placed into a given data packet.

Subsequently, the data packets are forwarded to the communication buffer 406 for transmission across the network 206 (FIG. 2) by the communication interface 312 (FIG. 3). To further promote resilience against packet loss, redundant picture headers may be transmitted in the data packets.

Conversely, the image processing engine 310 also processes video data packets received from a remote location and provides video signals for display. Initially, data packets are received by the communication interface 312 (FIG. 3), and forwarded to the communication buffer 406. The data packets are then sent to the macroblock packetization engine 404, which unpacks the macroblocks, and if necessary, orders the macroblocks back into their original, ordered pattern (i.e., pattern prior to macroblock packetization at the remote video conference station 204 (FIG. 2), which is typically raster-scan). Subsequently, the coding engine 402 functions as a decoder and reconstructs data of an original video frame using the refresh intra-coded macroblocks, other intra-coded macroblocks, and inter-coded macroblocks derived from the original video frame and previous video frames, and determines whether a data packet was lost in transit across the network 206 (FIG. 2).

For example, the refresh intra-coded macroblocks are used in lieu of motion compensation from reference frames that may be corrupted due to video data transmission errors. Any macroblock that may be corrupted due to video data transmission errors (and not corrected by an intra-coded macroblock) further propagates and typically magnifies prediction drift when the coding engine 402 uses the corrupted macroblocks as reference macroblocks for decoding other received inter-coded macroblocks. Thus, the refresh intra-coded macroblocks provide the coding engine 402 with a "fresh" set of intra-coded macroblocks to be used as reference macroblocks for subsequent decoded frames, thereby reducing prediction drift.

Typically, the coding engine 402 uses a variety of error concealment techniques to rebuild lost macroblocks employing such methods as spatial interpolation or motion vector estimation. These error concealment techniques are enhanced by using refresh intra-coded macroblocks. It should further be noted that although the same components are described herein as being used for both transmission and receiving functions, the components may be embodied in separate receiver and transmitter devices.

In another embodiment of the present invention, the coding engine 402 may generate an intra-macroblock map that identifies which macroblocks in a coded video frame are intra-coded. After the intra-macroblock map is generated, the image processing engine 310 sends the map to the remote video conference station 204 (FIG. 2). The map may be sent as part of a picture header data associated with the coded video frame, for example, although other data fields may be used.

Figure 5:
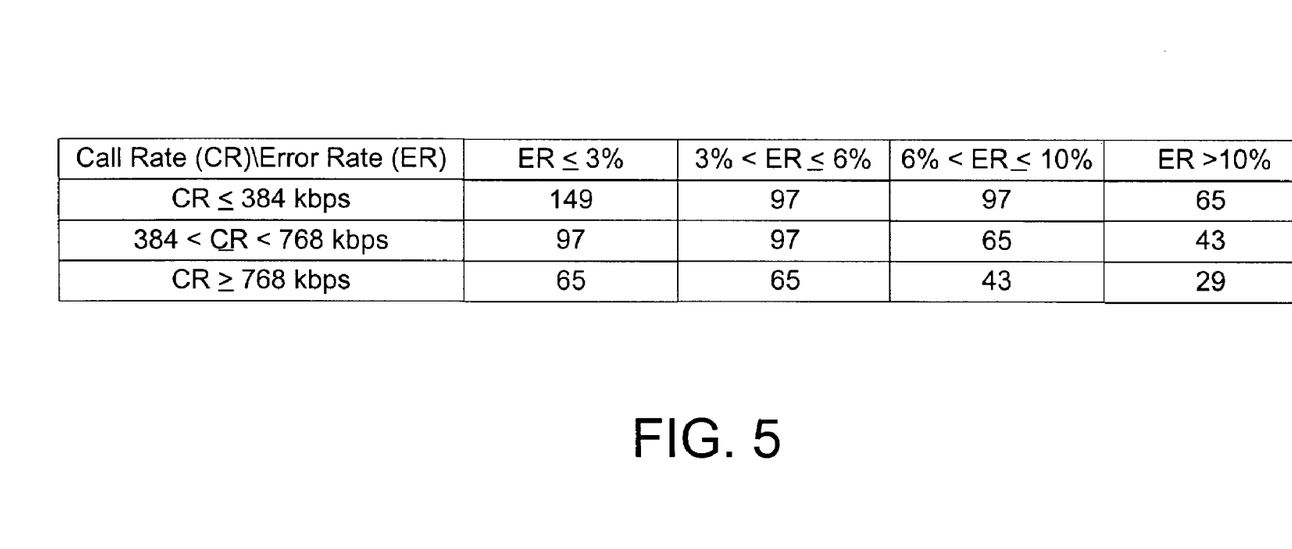
FIG. 5 is a table of intra-coded macroblock refresh intervals as a function of call rates and packet-loss error rates for a CIF formatted video frame, according to an exemplary embodiment of the invention.

FIG. 5 is a table of intra-coded macroblock refresh intervals as a function of call rates and packet-loss error rates for a CIF formatted video frame, according to an exemplary embodiment of the invention. The refresh intervals are given in number of frames. The FIG. 5 refresh intervals are for illustrative purposes, and are not meant to be exclusive of other values. In addition, the present invention covers other refresh intervals and video formats.

In one embodiment of the present invention, the coding engine 402 (FIG. 4) selects a refresh interval based upon a current network call rate and a current packet-loss error rate, and intra-codes a pattern of macroblocks as dictated by the selected refresh interval. The selected refresh interval is equivalent to a number of frames processed by the coding engine 402 such that every macroblock associated with a spatial position within a frame is intra-coded at least once after the number of frames specified by the refresh interval are processed. Since an intra-coded macroblock typically requires a larger number of bits than an inter-coded macroblock, the present invention optimizes the number of refresh intra-coded macroblocks based upon network communication parameters such as call rates and packet-loss error rates. As discussed further below in conjunction with FIGS. 6A–6C, for any given selected refresh interval (ri), a number of macroblocks between refresh intra-coded macroblocks is equal to ri−1. Therefore, for example, if ri=5, then the coding engine intra-codes every fifth macroblock (i.e., there are four macroblocks between refresh intra-coded macroblocks, since ri−1=4) such that every macroblock associated with a spatial position within a frame is intra-coded at least once after five frames are processed as long as the number of macroblocks in the frame is not a multiple of five.

The FIG. 5 embodiment of the present invention specifies a refresh interval (in number of frames) that decreases as the data rate of the video call (hereafter called the call rate) increases, for any given packet-loss error rate. For example, when less than 3% of the packets transmitted across the network 206 (FIG. 2) are lost (i.e., the packet-loss error rate is less than 3%; column 2, FIG. 5), the refresh interval decreases from 149 frames when the call rate is less than or equal to 384 kbps to 65 frames when the call rate is greater than or equal to 768 kbps. That is, as the call rate increases (for a given packet-loss error rate), more bandwidth is available to accommodate a larger number of refresh intra-coded macroblocks and still maintain good video quality. In addition, the FIG. 5 embodiment of the present invention specifies a refresh interval that decreases as the packet-loss error rate increases, for any given call rate. For example, when the call rate is greater than or equal to 768 kbps (row 4, FIG. 5), the refresh interval decreases from 65 frames when the error rate is less than or equal to 3% to 29 frames when the error rate is greater than 10%. That is, as more packets are lost, the probability of prediction drift increases, and therefore the coding engine 402 intra-codes a higher percentage of refresh macroblocks per frame to eliminate the persistence and propagation of errors due to packet loss.

Figure 6A:
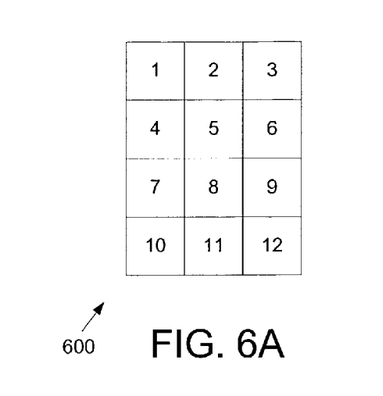
FIG. 6A is an exemplary frame comprised of n=12 macroblocks, according to one embodiment of the invention.

FIG. 6A is an exemplary frame 600 comprised of twelve macroblocks, according to one embodiment of the invention. For illustrative purposes, the twelve macroblocks are labeled 1–12. In one embodiment of the present invention, a refresh interval is any integer that has the following properties: a given integer divided into the number of macroblocks per frame (n) does not give an integer quotient (i.e., the given integer is not evenly divisible into the number of macroblocks per frame (n)), and the given integer does not have any factors that when divided into the number of macroblocks per frame (n) give integer quotients (i.e., any factors of the given integer are not evenly divisible into the number of macroblocks per frame(n)). This property ensures that every macroblock location will be intra-refreshed after the coding engine 402 processes ri frames, where ri is the refresh interval. Thus, for n=12, the refresh interval may be five, seven, or eleven, since five, seven, and eleven are not evenly divisible into n=12, and five, seven, and eleven do not have factors that are evenly divisible into n=12. However, the refresh interval cannot be any integer from the set of integers {1, 2, 3, 4, 6, 12} in the present embodiment, since any integer from the set of integers {1, 2, 3, 4, 6, 12} is evenly divisible into n=12. Furthermore, the refresh interval cannot be eight, since eight can be factored into four and two, both of which are evenly divisible into n=12. Likewise, the refresh interval cannot be nine, since nine can be factored into three and three, and three is evenly divisible into n=12. Finally, the refresh rate cannot be ten, since ten can be factored into five and two, and two is evenly divisible into n=12.

Figure 6B:
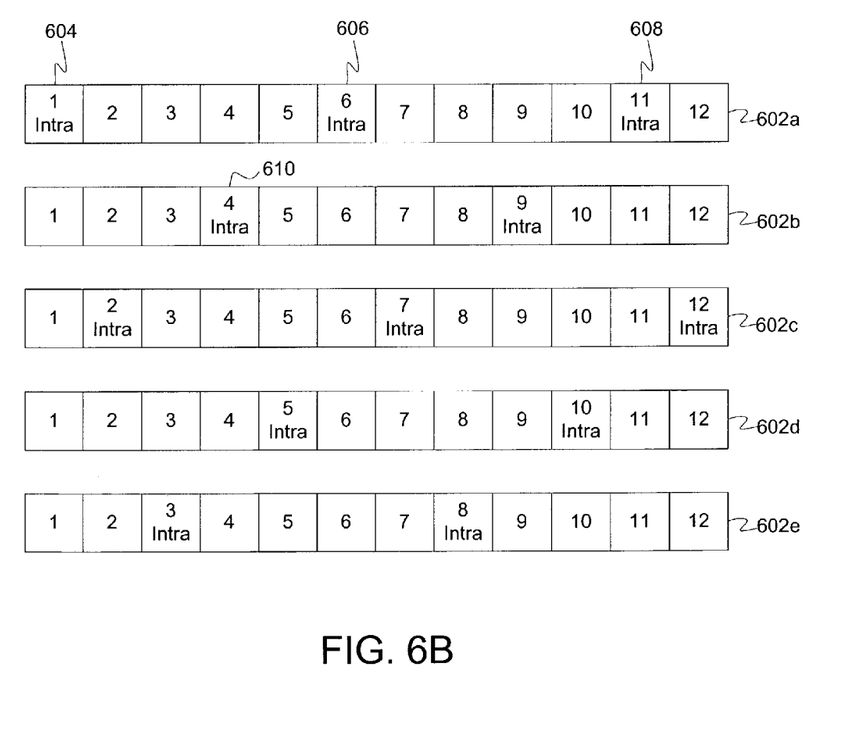
FIG. 6B illustrates five exemplary consecutive frames of n=12 macroblocks per frame with an allowable refresh interval of five.

FIG. 6B illustrates five consecutive frames 602 of n=12 macroblocks per frame with an allowable refresh interval of five, according to one exemplary embodiment. For illustrative purposes, the macroblocks of frames 602 are arranged in a linear sequence. After the coding engine 402 (FIG. 4) selects an allowable refresh interval of five (i.e., ri=5), the coding engine 402 then intra-codes every fifth macroblock as a refresh intra-coded macroblock. In other words, there are four macroblocks between refresh intra-coded macroblocks, since ri−1=4. For example, the coding engine 402 intra-codes a first macroblock 604 of a first frame 602a, skips four macroblocks and intra-codes a sixth macroblock 606 of the first frame 602a, skips four macroblocks and intra-codes the eleventh macroblock 608 of the first frame 602a, and skips four macroblocks and intra-codes the fourth macroblock 610 of a second frame 602b. The coding engine 402 continues to sequentially intra-code every fifth macroblock of the remaining macroblocks in frames 602b–602e, as well as every fifth macroblock in subsequent frames (not shown). After the coding engine 402 intra-codes the macroblocks of five consecutive frames, such as frames 602a–602e, for example, each macroblock of macroblocks 1–12 are intra-coded once. Therefore, when the coding engine 402 selects a refresh interval ri=5, the coding engine 402 intra-codes every fifth macroblock of consecutive frames, and intra-codes every macroblock associated with a spatial position within any frame once after processing the five consecutive frames 602.

Figure 6C:
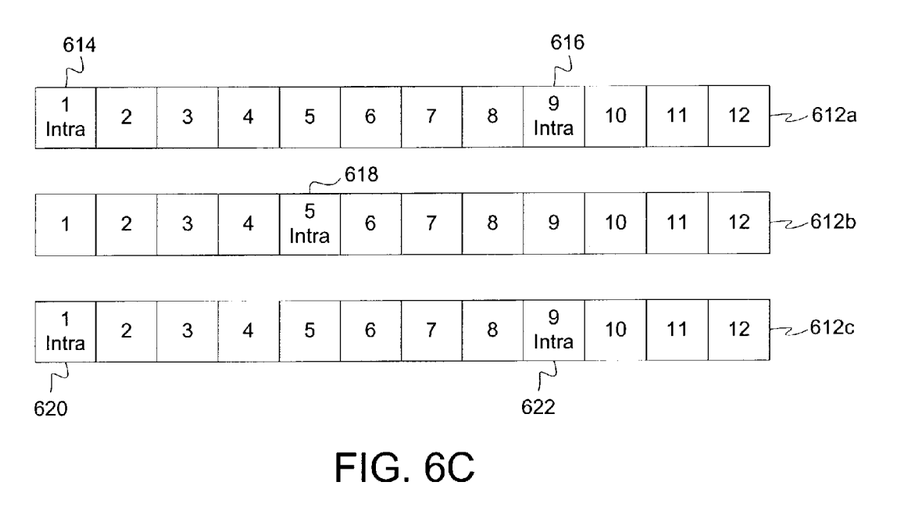
FIG. 6C illustrates three exemplary consecutive frames of n=12 macroblocks per frame with a non-allowable refresh interval of eight.

FIG. 6C illustrates three consecutive frames 612 of n=12 macroblocks per frame with a non-allowable refresh interval of eight. According to the present invention, a refresh interval of eight (i.e., ri=8) is not allowable. The reason ri≠8 is because the coding engine 402 skips seven (i.e., ri−1=7) macroblocks between refresh intra-coded macroblocks, and consequently not every macroblock is intra-coded at least once. For example, the coding engine 402 intra-codes a first macroblock 614 and a ninth macroblock 616 of a first frame 612a, and a fifth macroblock 618 of a second frame 612b. However, the intra-coding pattern of the first frame 612a would be repeated beginning with a third frame 612c, since the coding engine 402 intra-codes a first macroblock 620 and a ninth macroblock 622 of the third frame 612c, which occupy identical spatial positions within the third frame 612c as the first intra-coded macroblock 614 and the ninth intra-coded macroblock 616 within the first frame 612a. Therefore, a refresh interval of eight does not allow macroblocks 1–12 to be intra-coded at least once, since only macroblocks one, five, and nine are intra-coded, independent upon the number of frames processed by the coding engine 402.

Figure 7:
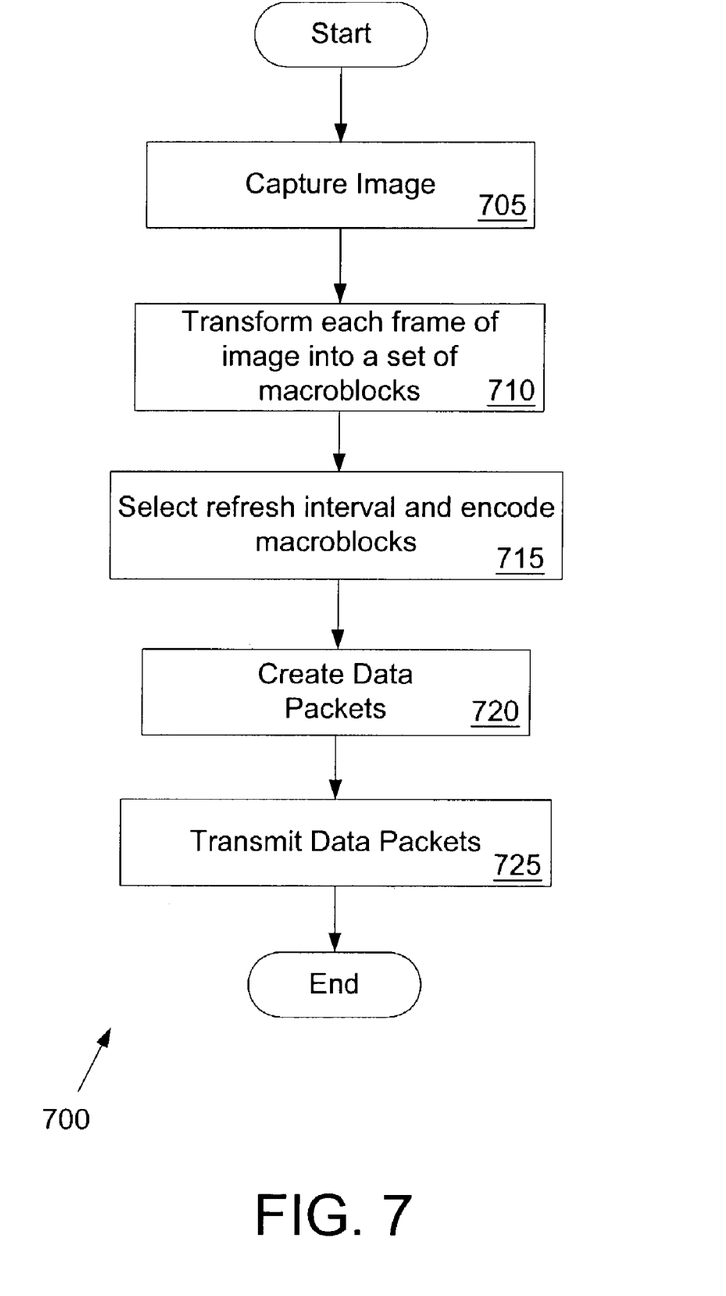
FIG. 7 is an exemplary flowchart of method steps for generating and transmitting refresh intra-coded macroblocks over packet switched networks, according to one embodiment of the invention.

FIG. 7 is an exemplary flowchart 700 of method steps for generating and transmitting refresh intra-coded macroblocks over packet switched networks, according to one embodiment of the present invention. In step 705, at least one video capture device 308 (FIG. 3) captures a video image and generates a video signal.

Next, in step 710, the coding engine 402 (FIG. 4) (also referred to as an encoder when processing data for transmission) receives the video signal and transforms each frame of the video signal into a set of macroblocks. In step 715, the coding engine 402 selects a refresh interval from a set of predefined integers based upon a call rate and a packet-based error rate, and intra-codes a pattern of refresh macroblocks based upon the selected refresh interval. In one embodiment of the invention, the set of predefined integers are stored in the memory 306 (FIG. 3). In an alternate embodiment of the invention, the coding engine 402 computes the refresh interval based upon the call rate and the packet-based error rate. Given a video format which specifies a given number of macroblocks per frame, the set of predefined integers includes all integers except those integers that when divided into the given number of macroblocks per frame give integer quotients (i.e., except those integers that are evenly divisible into the given number of macroblocks per frame), and except those integers comprised of one or more factors that when divided into the given number of macroblocks per frame give integer quotients (i.e., except those integers comprised of one or more factors that are evenly divisible into the given number of macroblocks per frame). The coding engine 402 then encodes the remaining macroblocks of each frame, based upon selection criteria that determines whether a given macroblock is intra-coded or inter-coded. A video frame may comprise inter-coded macroblocks, intra-coded macroblocks, or any combination of intra-coded and inter-coded macroblocks.

Next, the macroblock packetization engine 404 (FIG. 4) creates discrete data packets and places the encoded macroblocks into the discrete data packets in step 720. The encoded macroblocks may be placed into the discrete packets in a raster scan order of the macroblocks or some other predetermined order in the video frame, or according to error concealment techniques disclosed in patent application Ser. No. 10/226,504, filed Aug. 23, 2002, entitled "System and Method for Video Error Concealment," which is incorporated herein by reference. However, the scope of the present invention includes any method of grouping and packetizing the encoded macroblocks for transmission over the network 206 (FIG. 2). Alternatively, the macroblock packetization engine 404 may be a transport engine for placing the encoded macroblocks into a particular format for transport on a circuit-switched network (not shown). Finally, in step 725, the discrete data packets are sent to the communication buffer 406 (FIG. 4) for transmission to the remote video conference station 204 (FIG. 2) via the network 206.

Figure 8:
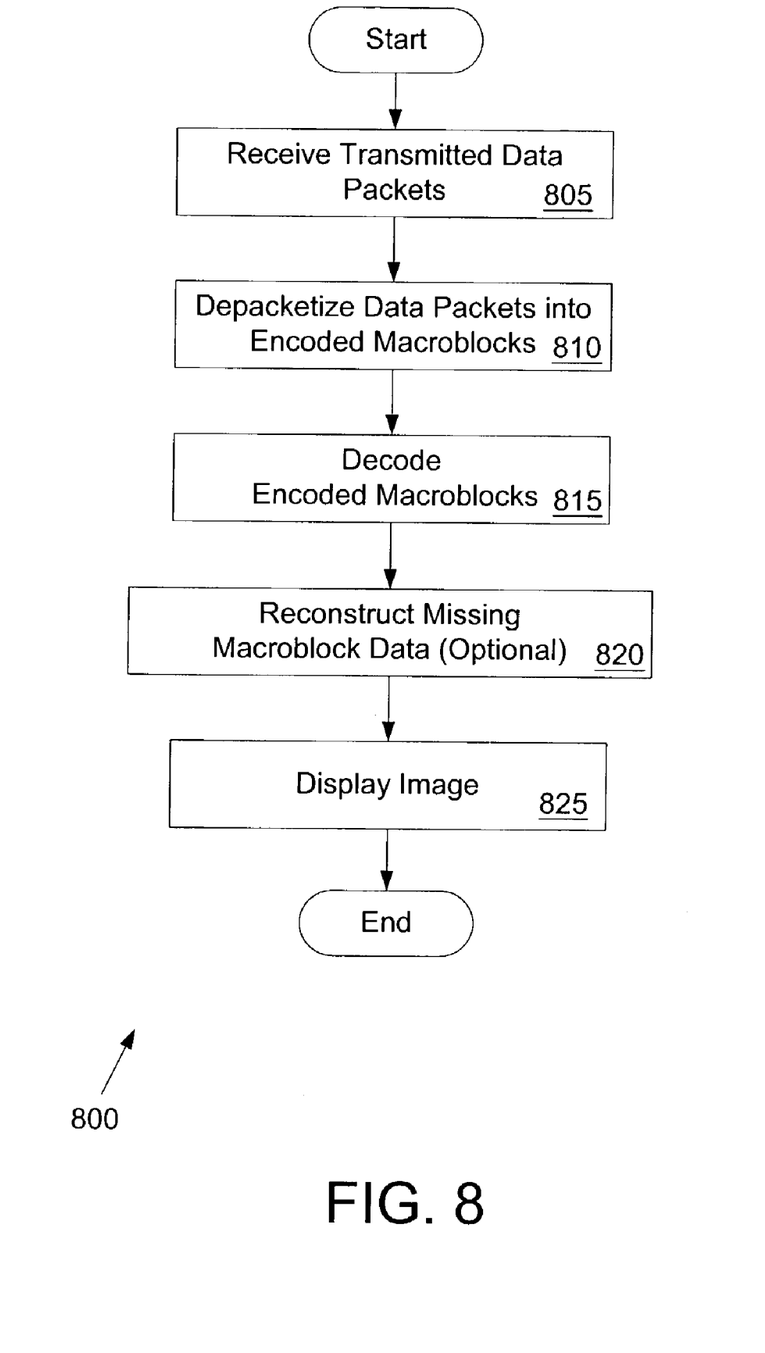
FIG. 8 is an exemplary flowchart of method steps for receiving video data over packet switched networks, according to one embodiment of the invention.

FIG. 8 is an exemplary flowchart 800 of method steps for receiving video data over packet switched networks, according to the present invention. In step 805, the communication buffer 406 (FIG. 4) receives transmitted data packets from the remote video conference station 204 (FIG. 2) via the network 206 (FIG. 2). Then, in step 810, the macroblock packetization engine 404 (FIG. 4) de-packetizes the received data packets into encoded macroblocks. If necessary, the macroblock packetization engine 404 also orders the encoded macroblocks and places the encoded macroblocks in proper spatial configuration within a video frame.

Next, the coding engine 402 (FIG. 4) decodes the encoded macroblocks in step 815. For example, if a given macroblock is an intra-coded macroblock, then the coding engine 402 decodes the intra-coded macroblock and places it in a newly decoded video frame. In addition, the coding engine 402 decodes inter-coded macroblocks to generate decoded residual, adds the decoded residual to data content of reference frame macroblocks, and places the results in the newly decoded video frame. The given macroblock may or may not be a refresh intra-coded macroblock.

Optionally, in step 820, the coding engine 402 (functioning as a decoder) or some other mechanism related to a video data packet transform (e.g., RTP sequence numbers) determines which macroblocks, if any, are lost in transit, and reconstructs these lost macroblocks using one or more data reconstruction schemes. Data reconstruction schemes such as motion estimation/compensation and data interpolation are described in the patent application Ser. No. 10/226,504 entitled "System and Method for Video Error Concealment." Finally, once the data contents of any missing macroblocks have been reconstructed, the macroblocks are displayed by the display device 302 (FIG. 3) in step 825.

The invention has been explained above with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method for video error concealment of a video signal, comprising the steps of:
   receiving a plurality of macroblocks, each frame of the video signal having an integer number of macroblocks;
   selecting a refresh interval based upon network call rates and packet-loss error rates; and
   encoding a subset of the plurality of macroblocks as refresh intra-coded macroblocks based upon the selected refresh interval;
   wherein the selected refresh interval is an integer m, the integer m and factors of the integer m when divided into the integer number of macroblocks per frame do not give integer quotients.

2. The method of claim 1, wherein for a given packet-loss error rate, the refresh interval decreases as a network call rate increases.

3. The method of claim 1, wherein for a given network call rate, the refresh interval decreases as a packet-loss error rate increases.

4. The method of claim 1, wherein the step of encoding a subset of the plurality of macroblocks further comprises intra-coding every mth macroblock as a refresh intra-coded macroblock.

5. The method of claim 1, wherein the selected refresh interval is equal to a number of video signal frames such that each macroblock associated with a spatial position within the video signal frames is encoded as a refresh intra-coded macroblock at least once.

6. The method of claim 1, further comprising the step of encoding macroblocks not in the subset of the plurality of macroblocks as inter-coded and intra-coded macroblocks.

7. The method of claim 6, further comprising the step of placing encoded macroblocks into discrete data packets for transmission across a packet-switched network.

8. The method of claim 6, further comprising the step of placing encoded macroblocks into a particular format for transport on a circuit-switched network.

9. The method of claim 1, further comprising the steps of decoding encoded macroblocks received from a remote device via a network and detecting missing macroblocks.

10. The method of claim 1, further comprising the steps of decoding the refresh intra-coded macroblocks received from a remote device via a network, and placing the decoded macroblocks in a newly decoded video frame for concealing effects of video error.

11. An electronic-readable medium having embodied thereon a program, the program being executable by a machine to perform method steps for video error concealment of a video signal, the method steps comprising:
    receiving a plurality of macroblocks, each frame of the video signal having an integer number of macroblocks;
    selecting a refresh interval based upon network call rates and packet-loss error rates; and
    encoding a subset of the plurality of macroblocks as refresh intra-coded macroblocks based upon the selected refresh interval,
    wherein the selected refresh interval is an integer m, the integer m and factors of the integer m when divided into the integer number of macroblocks per frame do not ge integer quotients.

12. The electronic-readable medium of claim 11, wherein the step of encoding a subset of the plurality of macroblocks further comprises intra-coding every mth macroblock as a refresh intra-coded macroblock.

13. The electronic-readable medium of claim 11, wherein the selected refresh interval is equal to a number of video signal frames such that each macroblock associated with a spatial position within the video signal frames is encoded as a refresh intra-coded macroblock at least once.

14. The electronic-readable medium of claim 11, further comprising the step of encoding macroblocks not in the subset of the plurality of macroblocks as inter-coded and intra-coded macroblocks.

15. The electronic-readable medium of claim 14, further comprising the step of placing encoded macroblocks into discrete data packets for transmission across a packet-switched network.

16. The electronic-readable medium of claim 14, further comprising the step of placing encoded macroblocks into a particular format for transport on a circuit-switched network.

17. The electronic-readable medium of claim 11, further comprising the steps of decoding encoded macroblocks received from a remote device via a network and detecting missing macroblocks.

18. The electronic-readable medium of claim 11, further comprising the steps of decoding the refresh intra-coded macroblocks received from a remote device via a network, and placing the decoded macroblocks in a newly decoded video frame for concealing effects of video error.

19. A system for video error concealment, comprising:
    a coding engine configured to
    process each frame of a video signal to generate macroblocks, each frame having an integer number of macroblocks dependent upon a video signal format,
    select a refresh interval based upon network communication parameters, wherein the selected refresh interval is an integer m, the integer m and factors of the integer m when divided into the integer number of macroblocks per frame do not give integer quotients, and
    encode a subset of macroblocks from the generated macroblocks as refresh intra-coded macroblocks based upon the selected refresh interval; and a macroblock packetization engine configured to place each of the encoded macroblocks into discrete data packets for transmission across a network.

20. The system of claim 19, wherein the network communication parameter is a network call rate.

21. The system of claim 19, wherein the network communication parameter is a packet-loss error rate.

22. The system of claim 19, wherein the coding engine encodes the subset of macroblocks by intra-coding every mth macroblock of the generated macroblocks as a refresh intra-coded macroblock.

23. The system of claim 19, wherein the packetization engine is a transport engine for placing each of the encoded macroblocks into a particular format for transport on a circuit-switched network.

24. The system of claim 19, wherein the coding engine is further configured to decode encoded macroblocks received from a remote device via the network and detects missing macroblocks.

25. The system of claim 19, wherein the coding engine is further configured to decode the refresh intra-coded macroblocks received from a remote device via the network, and place the decoded macroblocks in a newly decoded video frame for concealing effects of video error.

26. A system for video error concealment of a video signal, comprising:
    means for receiving a plurality of macroblocks, each frame of the video signal having an integer number of macroblocks;
    means for selecting a refresh interval based upon network call rates and packet-loss error rates, wherein the selected refresh interval is an integer m, the integer m and factors of the integer m when divided into the integer number of macroblocks per frame do not give integer quotients; and
    means for encoding a subset of the plurality of macroblocks as refresh intra-coded macroblocks based upon the selected refresh interval.

27. The system of claim 26 wherein the means for encoding encodes the subset of macroblocks by intra-coding every mth macroblock as a refresh intra-coded macroblock.

* * * * *